(12) United States Patent
White (10) Patent No.: US 10,243,788 B1
(45) Date of Patent: Mar. 26, 2019

(54) AUTOMATED CONFIGURATION OF DISTRIBUTED COMPUTING SYSTEMS

(71) Applicant: Accellion, Inc., Palo Alto, CA (US)

(72) Inventor: Clifford Andrew White, San Jose, CA (US)

(73) Assignee: Accellion, Inc., Palo Alto, CA (US)

( * ) Notice: Subject to any disclaimer, the term of this patent is extended or adjusted under 35 U.S.C. 154(b) by 250 days.

(21) Appl. No.: 15/001,678

(22) Filed: Jan. 20, 2016

Related U.S. Application Data (60) Provisional application No. 62/108,480, filed on Jan. 27, 2015.

(51) Int. Cl.
| | | |
|---|---|---|
| *G06F 15/177* | (2006.01) | |
| *H04L 12/24* | (2006.01) | |
| *H04L 29/08* | (2006.01) | |

(52) U.S. Cl.
CPC .......... *H04L 41/0806* (2013.01); *H04L 67/10* (2013.01)

(58) Field of Classification Search
CPC ............................ H04L 41/0806; H04L 67/10
USPC ........................................................ 709/220
See application file for complete search history.

(56) References Cited

U.S. PATENT DOCUMENTS

| | | | | |
|---|---|---|---|---|
| 6,286,038 B1 * | 9/2001 | Reichmeyer | ........ | H04L 41/0213 709/220 |
| 7,152,099 B1 * | 12/2006 | Arens | ............... | H04L 29/12235 709/220 |
| 7,519,077 B2 * | 4/2009 | Beathard | ................. | H04L 63/10 370/447 |
| 2005/0154923 A1 * | 7/2005 | Lok | ..................... | H04L 63/0428 726/19 |
| 2009/0279454 A1 * | 11/2009 | Wacker | ............. | H04L 29/12283 370/255 |
| 2014/0241212 A1 * | 8/2014 | Janardhanan | ........... | H04L 49/55 370/255 |
| 2016/0044040 A1 * | 2/2016 | Caffary, Jr. | ......... | G06F 21/6218 726/4 |

FOREIGN PATENT DOCUMENTS

EP    1955152 A1 *   8/2008   ............... G06F 8/61

* cited by examiner

*Primary Examiner* — Normin Abedin
*Assistant Examiner* — Atta Khan
(74) *Attorney, Agent, or Firm* — Raubvogel Law Office (57) ABSTRACT

A system and method may be used to automatically configure a distributed computing system. The method may be used to configure an unconfigured computing device for distributed computing in the distributed computing system. At the unconfigured computing device, a contact token comprising contact information may be received. At a processor of the unconfigured computing device, the contact information may be used to initiate transmission of a configuration data request to a first configured computing device of a plurality of configured computing devices that have been configured for distributed computing in the distributed computing system. At the unconfigured computing device, configuration data may be received from the first configured computing device. At the processor, the configuration data may be used to configure the unconfigured computing device for distributed computing in the distributed computing system.

17 Claims, 6 Drawing Sheets

AUTOMATED CONFIGURATION OF DISTRIBUTED COMPUTING SYSTEMS

CROSS-REFERENCE TO RELATED APPLICATION

The present application claims priority from U.S. Provisional Application Ser. No. 62/108,480 for "Automated Configuration of Distributed Computing Systems" filed Jan. 27, 2015, which is incorporated herein by reference.

TECHNICAL FIELD

The present document relates to configuration of distributed computing systems.

DESCRIPTION OF THE RELATED ART

Distributed computing systems enable the processing power, memory, and/or other resources of individual computing devices to be used cooperatively. Thus, large computing tasks or large groups of computing tasks can leverage the capabilities of multiple computing devices. Various protocols control the manner in which instructions and/or other data are passed between the individual computing devices of the distributed computing system.

Accordingly, existing distributed computing systems require that each computing device of the distributed system be configured to a certain extent in order to properly operate with other properly configured components. Such configuration operations can be cumbersome for the maintainers of such a system. In addition, they can limit the audience by which such a system can be configured without assistance, even when the system is reasonably simple to operate once configured.

In particular, a distributed computing system may grow over time as new computing devices become available for use in the distributed computing system. Thus, the task of configuring one or more computing devices for distributed computing may have to be manually carried out multiple times by an administrator or other user. Such configuration work can be cumbersome, particularly for distributing systems that grow in several stages.

SUMMARY

Various embodiments of the present disclosure facilitate the configuration of distributed computing systems. In some embodiments, where some computing devices ("configured computing devices") have already been configured for distributed computing, the systems and methods presented herein may provide for automated configuration (or "auto-configuration") of one or more new computing devices ("unconfigured computing devices") that are to be added to the distributed computing system. This may allow a reasonably untrained individual to configure and run a very large and complex distributed computing system with a very low possibility of error, even when computing devices are frequently added to the distributed computing system.

In order to ease the ability for an untrained individual to expand the capabilities of a distributed computing system, in at least one embodiment the automated configuration system involves very little user interaction. This may limit or eliminate the possibility of error or misconfiguration.

In at least one embodiment, an administrator of a network system may add an unconfigured computing device to a distributed computing system having a plurality of configured computing devices. The identity of the administrator may be authenticated on the network system. The administrator may use an administrative computing device.

The distributed computing system may provide the administrator with a contact token, which can then be provided to the unconfigured computing device. The contact token may contain contact information that enables the unconfigured computing device to properly contact the already configured and functioning portion of the distributed computing system (i.e., the configured computing devices). One of the configured computing devices may send configuration data to the unconfigured computing device in response to receipt of a configuration data request sent by the unconfigured computing device, per the contact token. The configuration data may be used by the unconfigured computing device to configure itself based upon the settings it receives from the configured computing device. After this auto-configuration process is finished, the basic configuration step needed to add a new computing device to the distributed computing system may be complete. Thus, expansion of the distributed footprint of the distributed computing system may be carried out with relative ease.

In some embodiments, steps may be taken to verify the identity of the unconfigured computing device prior to sending the configuration data to the unconfigured computing device. In such embodiments, the unconfigured computing device may first transmit an identity token to the distributed computing system via the administrative computing device. The identity token may be stored in the distributed computing system. Then, when the unconfigured computing device transmits the configuration data request, it may also transmit the identity token. The receiving computing device, which may be one of the configured computing devices of the distributed computing system, may compare the identity token with the stored identity token to verify the identity of the unconfigured computing device, prior to transmission of the configuration data to the unconfigured computing device. Thus, the security of data transmitted over the distributed computing system may be preserved.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

The systems and methods set forth herein may be applied to networked computing devices having any architecture. For illustrative purposes, the description herein references a network system as having a plurality of computing devices, some of which are linked to define a distributed computing system capable of utilizing a plurality of configured computing devices in cooperation with each other to carry out one or more tasks. One of skill in the art will recognize that the systems and methods of the present disclosure may be implemented in a wide variety of other contexts.

A distributed computing system may contain many configured computing devices. Complex configurations may be required to enable communication and data exchange between the configured computing devices. Once configured, these systems can be very powerful and can be used to solve very complex problems. However, one of the problems with managing large distributed computing systems is the burden of performing the initial configuration of an unconfigured computing device to be used on the distributed computing system.

In various embodiments, automated configuration of distributed computing systems may simplify the configuration process by allowing authorized users to simply copy a contact token, such as from one of the configured computing devices of the distributed computing system, or from some other source, into the unconfigured computing device. The contact token may be a text string or any other data element. The use of such a contact token may allow the user to easily configure a component to work with a new computing system.

In this application, a "computing device" is any device capable of processing digital data. A "processor" is the hardware element of a computing device that processes digital data. A "data store" is any device capable of digital short-term and/or long-term data storage. A data store may use any known hardware for nonvolatile and/or volatile data storage.

A "network system" is a collection of computing devices that are connected together to permit communication between the computing devices. A "distributed computing system" is a network system, which may optionally exist within a more extensive network system, in which the computing devices cooperatively carry out one or more computing tasks. A network system may optionally include a distributed computing system and one or more computing devices that are not part of the distributed computing system.

A "configured computing device" is a computing device that has been configured for distributed computing in a distributed computing system. An "unconfigured computing device" is a computing device that has not yet been configured, or is in some stage of the process of being configured, for distributed computing in a distributed computing system. A "token" is a computer-generated piece of data that may encapsulate information to be passed between computing systems, such as identity information, codes, or even randomly-generated data structures.

Figure 1A:
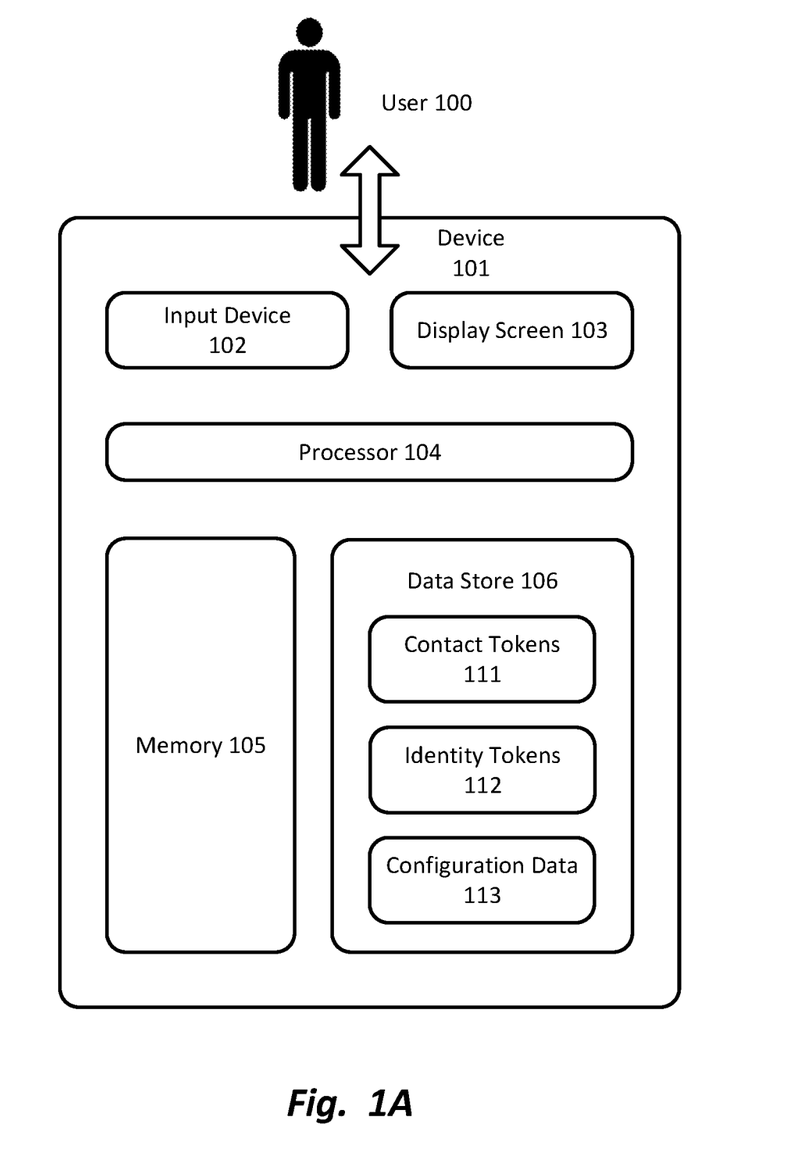
FIG. 1A is a block diagram depicting a hardware architecture according to one embodiment.
Figure 1B:
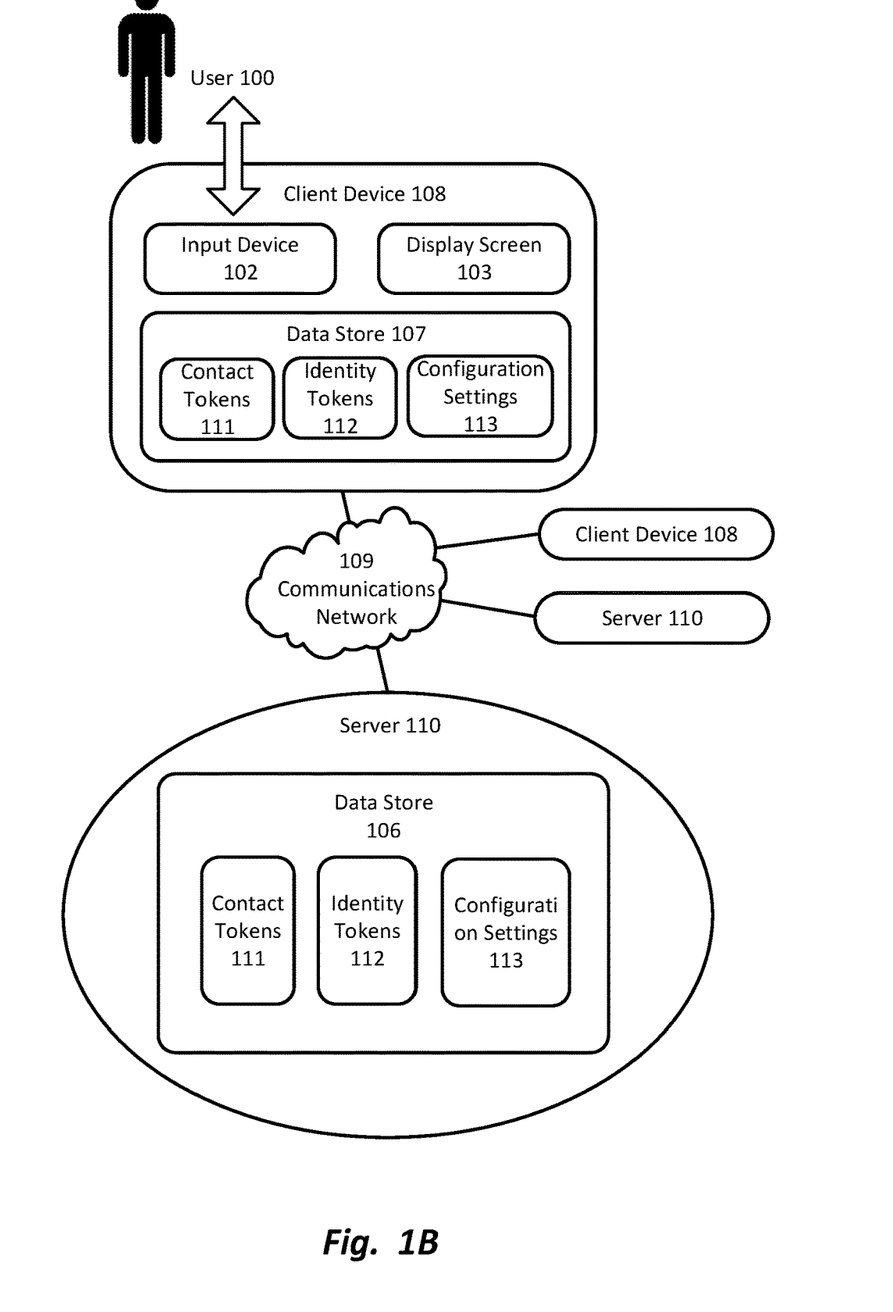
FIG. 1B is a block diagram depicting a hardware architecture in a client/server environment, according to one embodiment.

In some embodiments, one or more devices 101 and/or client devices 108, as shown and described in FIGS. 1A and 1B, may be used to implement a system and method according to the present disclosure. Thus, in the figures and descriptions below, it will be understood that any of the components and/or method steps shown or described may be implemented in one or more of the devices 101 and/or client devices 108. Further, the functions and/or method steps set forth below may be carried out by software running on the one or more of the devices 101 and/or client devices 108. This software may optionally be multi-function software that is used to retrieve, store, manipulate, and/or manage other aspects of the operation of a network system such as a distributed computing system.

System Architecture

According to various embodiments, the system can be implemented on any one or more electronic devices equipped to receive, store, and present information. Such an electronic device may be, for example, a desktop computer, laptop computer, smartphone, tablet computer, smartphone/tablet ("phablet"), wearable computing device, or the like.

Although the system is described herein in connection with an implementation in a desktop computer, one skilled in the art will recognize that the techniques described herein can be implemented in other contexts, and indeed in any suitable device. Accordingly, the following description is intended to illustrate various embodiments by way of example, rather than to limit scope.

Referring now to FIG. 1A, there is shown a block diagram depicting a hardware architecture for practicing the described system, according to one embodiment. Such an architecture can be used, for example, for implementing the techniques of the system in a computer or other device 101. Device 101 may be any electronic device.

In at least one embodiment, device 101 has a number of hardware components well-known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech. In at least one embodiment, input device 102 can be omitted.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and retrieved by device 101 when needed for presentation to user 100. Data store 106 may store one or more data sets, which may be used for a variety of purposes and may include a wide variety of files, metadata, and/or other data. In at least one embodiment, data store 106 may include contact tokens 111, identity tokens 112, configuration data 113, and/or other data (not shown), such as data to be passed between the configured computing devices of a distributed computing system for cooperative processing.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate means.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

Display screen 103 can be any element that displays information such as text and/or graphical elements. The display screen 103 may optionally display the inputs and/or outputs to and/or from distributed computing tasks. The display screen 103 may display any known user interface elements, including elements that modify the presentation of information on the display screen 103. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

Referring now to FIG. 1B, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

Client device 108 can be any electronic device incorporating the input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, or any combination thereof. In at least one embodiment, client device 108 transmits requests for data via communications network 109, and receives responses from server 110 containing the requested data. Such requests may be sent via HTTP as remote procedure calls or the like.

In one implementation, server 110 is responsible for data storage and processing, and incorporates data store 106. Server 110 may include additional components as needed for retrieving data from data store 106 in response to requests from client device 108.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

In at least one embodiment, data store 106 is organized in a file system. Appropriate indexing can be provided to associate data elements with each other. Data store 106 may include any of a wide variety of data structures known in the information storage arts, such as databases and other suitable data storage structures. As in FIG. 1A, data store 106 may include one or more data sets, which may include contact tokens 111, identity tokens 112, configuration data 113, and/or other data (not shown).

In addition to or in the alternative to the foregoing, the contact tokens 111 and/or the identity tokens 112 may also be stored in a data store 107 present in the client device 108. In some embodiments, the contact tokens 111, identity tokens 112, and/or configuration data 113 may have elements distributed between the server 110 and the client device 108 and/or other computing devices in order to facilitate secure and/or effective communication between these computing devices.

Display screen 103 can be any element that displays information such as text and/or graphical elements. The display screen 103 may optionally display the inputs and/or outputs to and/or from distributed computing tasks. The display screen 103 may display any known user interface elements, including elements that modify the presentation of information on the display screen 103. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software.

In one embodiment, some or all of the system can be implemented as software written in any suitable computer programming language, whether in a standalone or client/server architecture. Alternatively, it may be implemented and/or embedded in hardware.

Notably, multiple servers 110 and/or multiple client devices 108 may be networked together, and each may have a structure similar to those of the client device 108 and the server 110 that are illustrated in detail in FIG. 1B. Each client device 108 and/or server 110 may have the information and/or hardware resources to carry out distributed computing.

Figure 2:
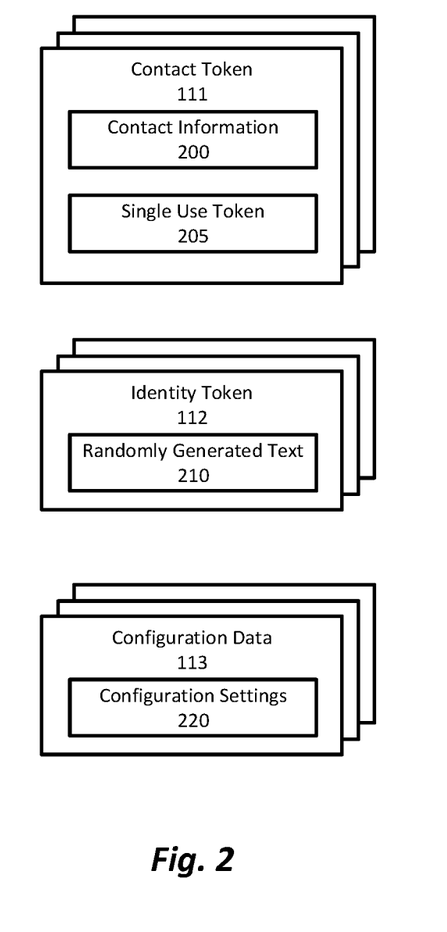
FIG. 2 is a block diagram depicting contact tokens, identity tokens, and configuration data according to one embodiment.

Referring to FIG. 2, a block diagram depicts the contact tokens 111, the identity tokens 112, and the configuration data 113 according to one embodiment. One or more of each of the contact tokens 111, identity tokens 112, and/or configuration data 113 may be stored in a computing device, such as a device 101 and/or a client device 108, at any given time.

As shown, each of the contact tokens 111 may have contact information 200. The contact information 200 may indicate how a computing system, such as a configured computing device, may be effectively contacted to request configuration data 113. In some embodiments, the contact information 200 may include the IP address of the configured computing device, which may be encoded as ASCII text along with a randomly-generated single use string using a base64 encoding of the IP address. In alternative embodiments, any other encoding technique may be used in the contact information 200 to store the information needed to request the configuration data 113 from the configured computing device.

Additionally, each of the contact token 111 may have a single use token 205. The single use token 205 may be used by a configured computing device to confirm the authenticity of a request for configuration data 113, as will be described subsequently.

In some embodiments, each of the identity tokens 112 may have identity information, such as IP addresses, MAC addresses, or the like that directly indicates the identity of the computing system that generated it. Alternatively, each identity token 112 need not indicate any of the particulars of a computing device, but may rather simply be transmitted repetitively by a computing device to enable the recipient computing device to compare the identity tokens 112 to confirm that the transmissions originate from the same computing device. For example, each of the identity tokens 112 may have randomly-generated text 210 that can be stored by the recipient computing device and compared with the randomly-generated text 210 received in a subsequent transmission to confirm that the same computing device originated both transmissions.

The configuration data 113 may include the information needed to configure an unconfigured computing device for distributed computing in a distributed computing system. Thus, the configuration data 113 may include configuration settings 220 that can be applied to the unconfigured computing device to enable the unconfigured computing device to communicate with one or more configured computing devices of the distributed computing system. In some embodiments, the configuration settings 220 may also be in the form of a token.

Automated Configuration

Once a distributed computing system has been configured, the systems and methods presented herein may be used to facilitate configuration of an unconfigured computing device to be added to the distributed computing system. Various methods for accomplishing this will be shown and described in connection with FIGS. 3A, 3B, 4, and 5, as follows.

Figure 3A:
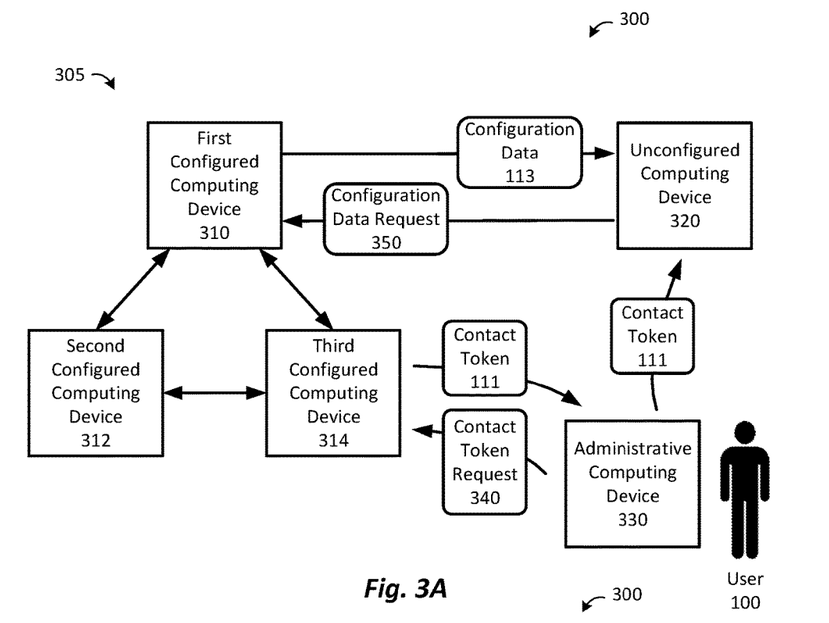
FIG. 3A is a block diagram depicting automated configuration of an unconfigured computing device for distributed computing, according to one embodiment.

Referring to FIG. 3A, a block diagram depicts automated configuration of an unconfigured computing device 320 for distributed computing, according to one embodiment. The block diagram illustrates some of the components of a network system 300 within which distributed may be carried out. A distributed computing system 305 may be a subset of the network system 300 in which a plurality of configured computing devices carry out distributed computing. The configured computing devices may include, by way of example, a first configured computing device 310, a second configured computing device 312, and a third configured computing device 314.

The first configured computing device 310, the second configured computing device 312, and the third configured computing device 314 may all already have been configured for distributed computing; accordingly, they may cooperatively carry out one or more computing tasks. The arrows between the first configured computing device 310, the second configured computing device 312, and the third configured computing device 314 illustrate the exchange of data between these configured computing devices in the course of distributed computing.

Prior to configuration of the unconfigured computing device 320, the unconfigured computing device 320 may be connected to the network system 300 for communications within the network system 300, but may not yet be configured for distributed computing. Thus, the unconfigured computing device 320 may initially be capable of communications with the distributed computing system 305, such as communications via protocols common across the network system 300 with the first configured computing device 310, the second configured computing device 312, and/or the third configured computing device 314.

In some embodiments, configuration of the unconfigured computing device 320 may be initiated by a user 100, such as a system administrator. The user 100 may use an administrative computing device 330 to initiate the configuration process. Various aspects of the configuration process may be carried out by steps taken in one or more of the configured computing devices of the distributed computing system 305, in the unconfigured computing device 320, and/or in the administrative computing device 330. Alternatively, configuration of the unconfigured computing device 320 may be automatically initiated, without requiring any action on the part of any user 100.

In alternative embodiments, one or more steps may be performed manually by the user 100, without using a computing device. For example, various data transmission steps may be performed manually by the user 100 by copying data to a thumb drive or other removable media from the source computing system, and then copying the data to the target computing system from the removable media. This may be done in addition to or in the alternative to usage of the data transmission infrastructure of the network system 300, which may utilize the administrative computing device 330. Hence, the presence of the administrative computing device 330 is optional, and the administrative computing device 330 need not be used to configure the unconfigured computing device 320 in some embodiments.

The various components of the network system 300 may be as shown in FIGS. 1A and 1B. For example, the first configured computing device 310, the second configured computing device 312, the third configured computing device 314, the unconfigured computing device 320, and/or the administrative computing device 330 may be, for example, client devices 108 and/or servers 110 as shown and described in FIG. 1B.

FIG. 3A illustrates an embodiment in which identity verification of the unconfigured computing device 320 is not employed. Thus, the identity tokens 112 may not be used in this embodiment, which will be described in connection with FIG. 4. Use of the identity token 112 will be shown and described in connection with FIG. 3B and FIG. 5.

Returning to FIG. 3A, a contact token request 340 may be transmitted from the user 100 and/or the administrative computing device 330 to one of the configured computing devices of the distributed computing system 305 (for example, to the third configured computing device 314). In response, a contact token 111 may be received by the user 100 and/or the administrative computing device 330 from the third configured computing device 314 and passed to the unconfigured computing device 320.

The unconfigured computing device 320 may use the contact token 111 to contact the distributed computing system 305, for example via the first configured computing device 310, to transmit a configuration data request 350. In response, the distributed computing system 305 may transmit, via the first configured computing device 310, configuration data 113 to the unconfigured computing device 320.

Figure 3B:
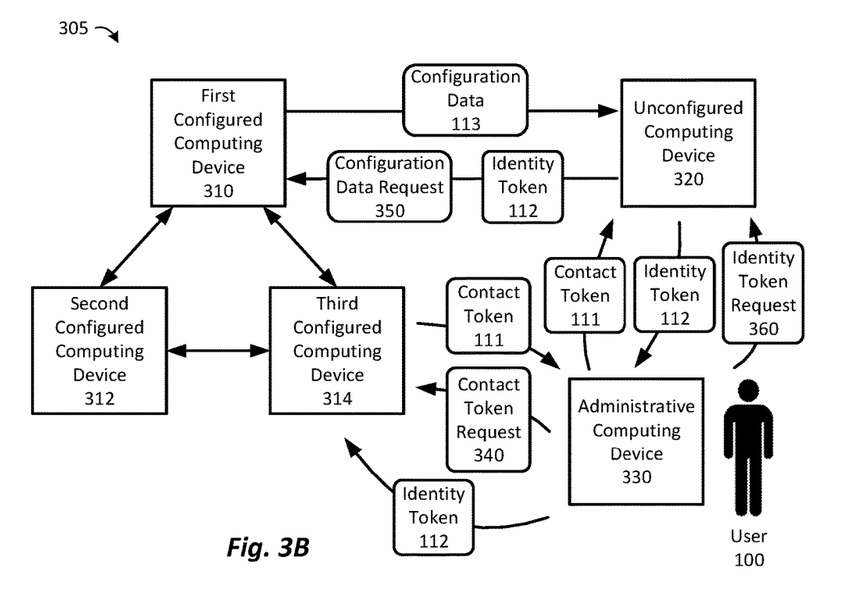
FIG. 3B is a block diagram depicting automated identity verification and configuration of an unconfigured computing device for distributed computing, according to one embodiment.

Referring to FIG. 3B, a block diagram depicts automated identity verification and configuration of an unconfigured computing device 320 for distributed computing, according to one embodiment. FIG. 3B also depicts the network system 300 of FIG. 3A, which may again include the distributed computing system 305, with the first configured computing device 310, the second configured computing device 312, and the third configured computing device 314. The network system 300 may also include the unconfigured computing device 320 and the administrative computing device 330, as in FIG. 3A.

FIG. 3B illustrates the use of the same data structures as in FIG. 3A, with the addition of the identity tokens 112. As shown in FIG. 3B, the user 100 and/or the administrative computing device 330 may transmit an identity token request 360 to the unconfigured computing device 320. The identity token 112 may be transmitted by the unconfigured computing device 320 to the user 100 and/or the administrative computing device 330, which may then transmit it to the distributed computing system 305, for example via the third configured computing device 314.

The identity token 112 may also be transmitted by the unconfigured computing device 320 to the distributed computing system 305 with the configuration data request 350. This may enable the distributed computing system 305 to confirm the identity of the unconfigured computing device 320 before sending the configuration data 113 to the unconfigured computing device 320.

Figure 4:
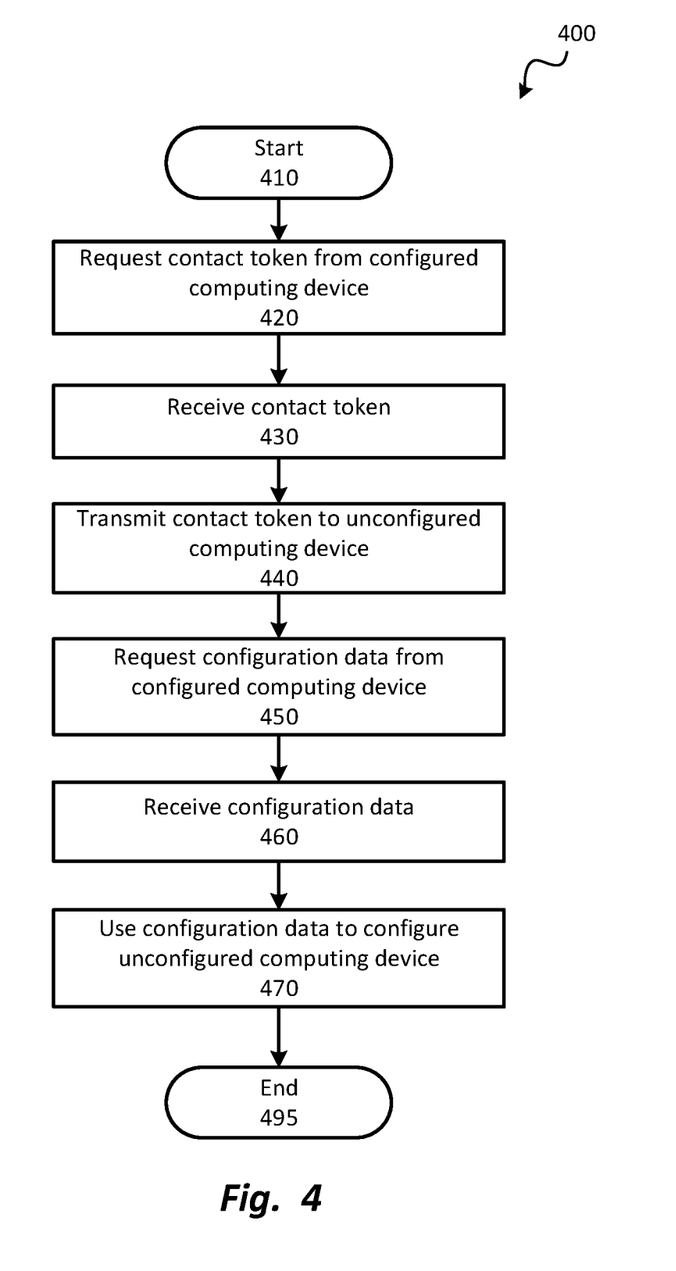
FIG. 4 is a flowchart diagram depicting a method for automatically configuring an unconfigured computing device for distributed computing, as in FIG. 3A.

Referring to FIG. 4, a flowchart diagram illustrates a method 400 for automatically configuring the unconfigured computing device 320 for distributed computing, as in FIG. 3A. The method 400 may be carried out through the use of various components of the network system 300, including the distributed computing system 305 shown in FIG. 3A. The network system 300 may incorporate one or more of each of the device 101, client device 108, and/or the server 110 of FIGS. 1A and 1B, and may involve use of the architectures of FIG. 2, as will be described by way of example below. Additionally or alternatively, other systems may be used to carry out the method 400. Further, a network system 300 such as that of FIGS. 3A and 3B and/or the architectures of FIG. 2 may be used to carry out other methods of configuring a computing device for distributing computing, besides the method 400 of FIG. 4.

As shown, the method 400 may start 410 with a step 420 in which a contact token 111 is requested from the distributed computing system 305. This may be done, for example, by the administrative computing device 330, which may transmit the contact token request 340 to one of the configured computing devices of the distributed computing system 305. Alternatively, as mentioned previously, the user 100 may access one of the configured computing devices of the distributed computing system 305 manually to provide the contact token request 340, thereby completing the step 420.

In some embodiments, the contact token request 340 may be transmitted to any of the configured computing devices of the distributed computing system 305. The specific configured computing device may be selected via arbitrary selection, by optimizing the route of the contact token request 340 to send the contact token request 340 to the configured computing device that is likely to respond most rapidly, and/or the like. In the exemplary embodiment of FIG. 3A, the contact token request 340 is transmitted to the third configured computing device 314.

The third configured computing device 314 may provide the contact token 111 to the user 100 and/or the administrative computing device 330 in response to receipt of the contact token request 340. The third configured computing device 314 may, for example, generate the contact token 111 by encoding its own addressing information. Specifically, the third configured computing device 314 may encode its current IP address as ASCII text along with a randomly generated single use string using a base64 encoding of the address. In other embodiments, other encoding methods may be used.

In a step 430, the contact token 111 may be received, for example, in the administrative computing device 330 or the user 100. In some embodiments, this may be done over the communications infrastructure used by the network system 300. Alternatively, the contact token 111 may be received manually by the user 100. The contact token 111 may be presented to the user 100 on the third configured computing device 314, on the administrative computing device 330, through an HTML rendering, or by some other presentation mechanism. In some embodiments, the user 100 may manually receive the contact token 111, such as by copying the contact token 111 to a thumb drive or other removable media, as described previously. In yet other embodiments, the step 430 may not involve electronic transmission of the contact token 111; rather, the contact token 111 may be written down or otherwise copied in non-electronic form.

The software used to carry out the method 400 may be an HTML display or terminal program, in some embodiments. The software may receive the IP address of the unconfigured computing device 320 from the user 100, and may present the user 100 with options as to how the unconfigured computing device 320 is to be configured. For example, the user 100 may have the option to configure the unconfigured computing device 320 as a new distributed computing system, or to add the unconfigured computing device 320 to an existing distributed computing system such as the distributed computing system 305. The user 100 may make a selection to add the unconfigured computing device 320 to an existing distributed computing system. The software may then prompt the user 100 to provide the contact token 111 to the unconfigured computing device 320.

In a step 440, the contact token 111 may be transmitted to the unconfigured computing device 320. This may also be done electronically via the communications infrastructure used by the network system 300, electronically via removable media, and/or through the use of non-electronic media. If written or printed, the contact token 111 may be scanned, manually keyed, or otherwise entered into the unconfigured computing device 320.

Once the step 440 has been completed, the contact token 111 may be stored on the data store 106 of the unconfigured computing device 320. The unconfigured computing device 320 may decode the contact token 111 using the appropriate decoding scheme, and may extract the contact information 200 in the form of the IP address, and a single use token 205 for accessing the third configured computing device 314, from the contact token 111.

In a step 450, the unconfigured computing device 320 may use the contact information 200 from the contact token 111 to transmit the configuration data request 350 to the distributed computing system 305, or more specifically, to the first configured computing device 310. The configuration data request 350 may be sent as an HTTPS request, and may include, as part of the payload, the single use token 205 extracted by the unconfigured computing device 320.

The first configured computing device 310 may receive the configuration data request 350, and may carry out various steps to verify the authenticity of the configuration data request 350. For example, the first configured computing device 310 may verify that the single use token 205 transmitted with the configuration data request 350 has not been used previously and has, in fact, been encoded into the contact token 111 by the user 100. If the single use token 205 has already been used, or has not been encoded into a contact token 111 by the user 100, the first configured computing device 310 may return an error. Otherwise, the first configured computing device 310 may transmit the configuration data 113 to the unconfigured computing device 320, per the configuration data request 350.

In a step 460, the configuration data 113 may be received by the unconfigured computing device 320. The configuration data 113 may contain all of the information needed for the unconfigured computing device 320 to configure itself and successfully communicate and exchange data with the rest of the distributed computing system 305. This information may include the configuration settings 220, as indicated previously.

In a step 470, the unconfigured computing device 320 may use the configuration data 113 to configure itself for distributed computing on the distributed computing system 305. This may be done by applying the configuration settings 220 of the configuration data 113 to itself. This may enable the unconfigured computing device 320 to exchange data with the first configured computing device 310, the second configured computing device 312, and/or the third configured computing device 314. Thus, the unconfigured computing device 320 may cooperate with the configured computing devices of the distributed computing system 305 in the joint performance of computing tasks. The method 400 may then end 495.

The method 400 may enable a user 100, such as an administrator, to create and configure a distributed computing system via the exchange of one or more simple tokens generated from an existing distributed computing system with the new, unconfigured computing device. The unconfigured computing device that receives the token(s) may then be automatically configured as a new addition to the distributed computing system. The token(s) provided to the unconfigured computing device may contain all of the information needed by the unconfigured computing device to locate, route information to, and register as a new member of the distributed computing system.

Beneficially, this process may not require the user who initiates the configuration process to understand anything beyond transporting text characters from the configured computing device to the input of the unconfigured computing device. Further, the configuration data 113 provided by the configured computing device may be output to the user through by any known output method (for example, sonically or visually) without losing any of the required information needed to properly add the unconfigured computing device to the distributed computing system.

Most distributed computing systems are operated in a trusted environment. However, some users may have security concerns and wish to have the ability to specify which computing devices can configure themselves to exchange data with the configured computing devices of a distributed computing system. Accordingly, in some embodiments, the automated configuration systems and methods of the present disclosure may offer a more secure exchange mode.

In the event that the network system 300 and/or the distributed computing system 305 is configured to verify the identity of a computing device prior to configuration, a modified version of the method 400 may instead be followed. This modified method will be shown and described in connection with FIG. 5, as follows.

Figure 5:
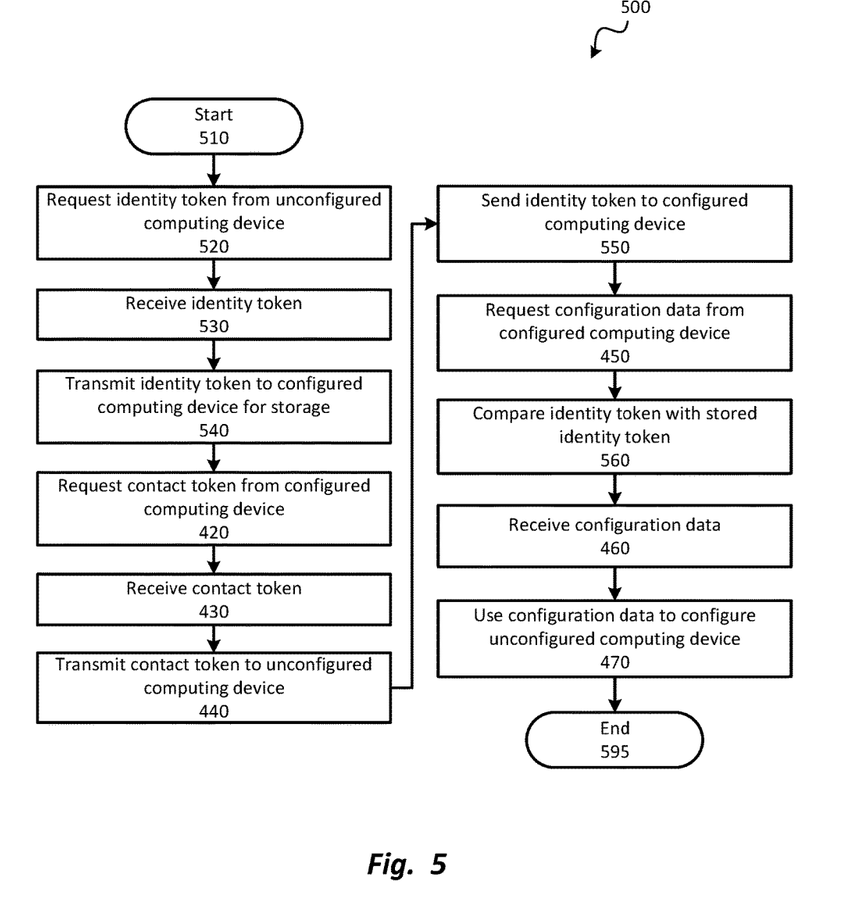
FIG. 5 is a flowchart diagram depicting a method for automatically verifying identity and configuring an unconfigured computing device for distributed computing, as in FIG. 3B.

Referring to FIG. 5, a flowchart diagram depicts a method 500 for automatically verifying identity and configuring an unconfigured computing device 320 for distributed computing, as in FIG. 3B. As with the method 400, the method 500 may be carried out through the use of various components of the network system 300, including the distributed computing system 305 shown in FIG. 3A. The network system 300 may incorporate one or more of each of the device 101, the client device 108, and/or the server 110 of FIGS. 1A and 1B and may involve use of the architectures of FIG. 2, as will be described by way of example below. Additionally or alternatively, other systems may be used to carry out the method 500. Further, a network system 300 such as that of FIGS. 3A and 3B and/or the architectures of FIG. 2 may be used to carry out other methods of configuring a computing device for distributing computing, besides the method 400 of FIG. 4 and the method 500 of FIG. 5.

As shown, the method 500 may start 510 with a step 520 in which the user 100 and/or the administrative computing device 330 transmits an identity token request 360 to the unconfigured computing device 320. This request may be transmitted electronically via the communications infrastructure used by the network system 300, or may be entered into the unconfigured computing device 320 manually by the user 100. The unconfigured computing device 320 may generate the identity token 112, for example, by generating the randomly-generated text 210. The randomly-generated text 210 may include a series of ASCII characters or the like, recorded for single use.

In a step 530, the user 100 and/or the administrative computing device 330 may receive the identity token 112, and may record the identity token 112. This may be done electronically over the communications infrastructure used by the network system 300, electronically via removable media, and/or non-electronically using paper or other non-electronic media, as described previously in connection with other method steps.

In a step 540, the user 100 and/or the administrative computing device 330 may provide the identity token 112 to the distributed computing system 305. In some examples, the identity token 112 may be sent with the contact token request 340. As in FIG. 3A, the contact token request 340 may be transmitted to the third configured computing device 314, by way of example. The identity token 112 for the unconfigured computing device 320 may also be sent to the third configured computing device 314 along with the contact token request 340. The third configured computing device 314 may record the identity token 112 for future use.

The method 500 may include the step 420, the step 430, and the step 440, which may be carried out substantially as set forth in the description of the method 400. Thus, the contact token request 340 may be sent to the third configured computing device 314, and the contact token 111 may be received from the third configured computing device 314 and transmitted to the unconfigured computing device 320.

In a step 550, the identity token 112 may be sent by the unconfigured computing device 320 to the distributed computing system 305. The identity token 112 may, for example, be transmitted to the first configured computing device 310 along with the configuration data request 350. Thus, the step 550 may be carried out in conjunction with performance of the step 450, which may otherwise be substantially as set forth in the description of the method 400.

In a step 560, the distributed computing system 305, or, for example, the first configured computing device 310, may compare the identity token 112 with that received previously in the step 540, which was recorded by the third configured computing device 314. Various tokens may be transmitted between the configured computing devices of the distributed computing system 305 so that this comparison need not be made by the same configured computing device as that which initially received the identity token 112.

If the identity token 112 matches that recorded previously by the third configured computing device 314, and the other conditions are met (the single use token 205 transmitted with the configuration data request 350 has not been used previously and has, in fact, been encoded into the contact token 111 by the user 100), the first configured computing device 310 may transmit the configuration data 113 to the unconfigured computing device 320. In this manner, the distributed computing system 305 may verify the identity of the unconfigured computing device 320, in addition to performing the validation steps of the method 400, prior to providing the configuration data 113 to the unconfigured computing device 320.

The step 460 and the step 470 may be carried out substantially as set forth in the description of the method 400 of FIG. 4. Thus, the unconfigured computing device 320 may receive the configuration data 113, and may use the configuration data 113 to configure itself for distributed computing in the distributed computing system 305. The method 500 may then end 595.

Beneficially, through the use of the method 500, the distributed computing system may not allow an unconfigured computing device to be added to it if the unconfigured computing device is not properly configured (aside from configuration for distributed computing), does not have the appropriate access to the rest of the distributed computing system, or might otherwise cause harm to the integrity of the distributed computing system. Further, a request to add an unconfigured computing device to the distributed computing system may be rejected if it is accompanied by a token that was not generated by the distributed computing system.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method for configuring a distributed computing system, the method comprising:
   at an unconfigured computing device to be configured for distributed computing in the distributed computing system, transmitting a contact token request to a first configured computing device of a plurality of configured computing devices that have been configured for distributed computing in the distributed computing system;
   at the first configured computing device, receiving the contact token request;
   at the first configured computing device, automatically, and without user direction, generating a contact token comprising contact information that enables the unconfigured computing device to automatically, and without user direction, contact at least one configured computing device of the distributed computing system;
   responsive to receiving the contact token request at the first configured computing device, automatically, and without user direction, transmitting, via a communications network, the contact token from the first configured computing device to the unconfigured computing device;
   at the unconfigured computing device, receiving the contact token;
   at a processor of the unconfigured computing device, using the contact information to automatically, and without user direction, initiate transmission, via the communications network, of a configuration data request to the first configured computing device;
   at the unconfigured computing device, automatically, and without user direction, receiving, from the first configured computing device, configuration data comprising configuration settings used by the first configured computing device to enable it to carry out distributed computing in the distributed computing system; and
   at the processor, automatically, and without user direction, applying the configuration settings to the unconfigured computing device so as to configure the unconfigured computing device so that it can function as a distributed computing component of the distributed computing system.

2. The method of claim 1, wherein automatically transmitting the contact token from the first configured computing device to the unconfigured computing device comprises:
   automatically, and without user direction, transmitting the contact token from the first configured computing device to an administrative computing device; and
   automatically, and without user direction, transmitting the contact token from the administrative computing device, the contact token to the unconfigured computing device.

3. The method of claim 1, wherein automatically generating the contact token comprises automatically, and without user direction, encoding a first single use token into the contact token;
   and wherein the method further comprises, at the first configured computing device:
   receiving the configuration data request from the unconfigured computing device, the configuration data request comprising a second single use token; and
   verifying that the second single use token corresponds to the first single use token.

4. The method of claim 1, wherein the contact information comprises an IP address used by the first configured computing device, encoded as ASCII text;
   and wherein using the contact information to automatically initiate transmission of a configuration data request comprises automatically, and without user direction, transmitting the configuration data request to the IP address.

5. The method of claim 1, further comprising, prior to receiving the contact token at the unconfigured computing device:
at the processor, automatically, and without user direction, initiating transmission of an identity token;
in one of the plurality of configured computing devices, receiving the identity token; and
in the one of the plurality of configured computing devices, automatically, and without user direction, storing the identity token as a stored identity token.

6. The method of claim 5, further comprising, prior to automatically initiating transmission of the identity token, automatically, and without user direction, transmitting an identity token request to the unconfigured computing device;
wherein the method further comprises, prior to receiving the identity token in the configured computing device:
receiving the identity token; and
automatically, and without user direction, transmitting the identity token to the one of the plurality of configured computing devices.

7. The method of claim 5, wherein automatically initiating transmission of the configuration data request comprises automatically, and without user direction, initiating transmission of the identity token to the first configured computing device;
wherein the method further comprises, prior to receiving the configuration data from the first configured computing device, automatically, and without user direction, comparing the identity token with the stored identity token in the first configured computing device to confirm an identity of the unconfigured computing device.

8. The method of claim 5, wherein the one of the plurality of configured computing devices comprises the first configured computing device.

9. At least one non-transitory computer-readable medium for configuring a distributed computing system, comprising instructions stored thereon, that when executed by at least one processor, perform the steps of:
at an unconfigured computing device to be configured for distributed computing in the distributed computing system, transmitting a contact token request to a first configured computing device of a plurality of configured computing devices that have been configured for distributed computing in the distributed computing system;
at the first configured computing device, receiving the contact token request;
at the first configured computing device, automatically, and without user direction, generating a contact token comprising contact information that enables the unconfigured computing device to automatically, and without user direction, contact at least one configured computing device of the distributed computing system;
responsive to receiving the contact token request at the first configured computing device, automatically, and without user direction, transmitting, via a communications network, the contact token from the first configured computing device to the unconfigured computing device;
causing the unconfigured computing device to receive the contact token;
using the contact information to automatically, and without user direction, initiate transmission, via the communications network, of a configuration data request to the first configured computing device;
causing the unconfigured computing device to automatically, and without user direction, receive, from the first configured computing device, configuration data comprising configuration settings used by the first configured computing device to enable it to carry out distributed computing in the distributed computing system; and
automatically, and without user direction, applying the configuration settings to the unconfigured computing device so as to configure the unconfigured computing device so that it can function as a distributed computing component of the distributed computing system.

10. The at least one non-transitory computer readable medium of claim 9, wherein automatically generating the contact token comprises automatically, and without user direction, encoding a first single use token into the contact token;
and wherein the non-transitory computer-readable medium further comprises instructions stored thereon, that when executed by a processor, cause the first configured computing device to perform the steps of:
receiving the configuration data request from the unconfigured computing device, the configuration data request comprising a second single use token; and
verifying that the second single use token corresponds to the first single use token.

11. The at least one non-transitory computer-readable medium of claim 9, wherein the contact information comprises an IP address used by the first configured computing device, encoded as ASCII text;
and wherein using the contact information to automatically initiate transmission of a configuration data request comprises automatically, and without user direction, transmitting the configuration data request to the IP address.

12. The at least one non-transitory computer-readable medium of claim 9, further comprising instructions stored thereon, that when executed by a processor, perform the steps of, prior to receiving the contact token at the unconfigured computing device:
automatically, and without user direction, initiating transmission of an identity token;
causing one of the plurality of configured computing devices to receive the identity token; and
causing one of the plurality of configured computing devices to automatically, and without user direction, store the identity token as a stored identity token;
wherein automatically initiating transmission of the configuration data request comprises automatically, and without user direction, initiating transmission of the identity token to the first configured computing device;
and wherein the at least one non-transitory computer-readable medium further comprises instructions stored thereon, that when executed by a processor, perform the step of, prior to receiving the configuration data from the first configured computing device, automatically, and without user direction, comparing the identity token with the stored identity token in the first configured computing device to confirm an identity of the unconfigured computing device.

13. The at least one non-transitory computer-readable medium of claim 12, further comprising instructions stored thereon, that when executed by a processor, perform the step of, prior to automatically initiating transmission of the identity token, automatically, and without user direction, transmitting an identity token request to the unconfigured computing device;
  wherein the at least one non-transitory computer-readable medium further comprises instructions stored thereon, that when executed by a processor, perform the steps of, prior to receiving the identity token in the configured computing device:
  receiving the identity token; and
  automatically, and without user direction, transmitting the identity token to the one of the plurality of configured computing devices.

14. A system for configuring a distributed computing system, the system comprising:
  a plurality of configured computing devices that have been configured for distributed computing in the distributed computing system; and
  an unconfigured computing device to be configured for distributed computing in the distributed computing system, configured to transmit a contact token request to a first configured computing device of the plurality of configured computing devices;
  and wherein:
  the first configured computing device is further configured to receive the contact token request;
  the first configured computing device is further configured to, automatically, and without user direction, generate a contact token comprising contact information that enables the unconfigured computing device to automatically, and without user direction, contact at least one configured computing device of the distributed computing system;
  the first configured computing device is further configured to, responsive to receiving the contact token request at the first configured computing device, automatically, and without user direction, transmit, via a communications network, the contact token from the first configured computing device to the unconfigured computing device;
  the unconfigured computing device is further configured to receive the contact token; and
  the unconfigured computing device comprises a processor configured to use the contact information to automatically, and without user direction, initiate transmission, via the communications network, of a configuration data request to the first configured computing device;
  the unconfigured computing device is further configured to automatically, and without user direction, receive, from the first configured computing device, configuration data comprising configuration settings used by the first configured computing device to enable it to carry out distributed computing in the distributed computing system; and
  the processor is further configured to automatically, and without user direction, apply the configuration settings to the unconfigured computing device so as to configure the unconfigured computing device so that it can function as a distributed computing component of the distributed computing system.

15. The system of claim 14, wherein the first configured computing device is configured to automatically generate the contact token by automatically, and without user direction, encoding a first single use token into the contact token;
  and wherein the first configured computing device is further configured to:
  receive the configuration data request from the unconfigured computing device, the configuration data request comprising a second single use token; and
  verify that the second single use token corresponds to the first single use token.

16. The system of claim 14, wherein the contact information comprises an IP address used by the first configured computing device, encoded as ASCII text;
  and wherein the unconfigured computing device is configured to use the contact information to automatically initiate transmission of the configuration data request by automatically, and without user direction, transmitting the configuration data request to the IP address.

17. The system of claim 14, wherein the processor is further configured, prior to receiving the contact token at the unconfigured computing device, to automatically, and without user direction, initiate transmission of an identity token to the first configured computing device;
  wherein at least one of the plurality of configured computing devices is further configured to:
  receive the identity token;
  automatically, and without user direction, store the identity token as a stored identity token; and
  prior to receipt of the configuration data in the unconfigured computing device, automatically, and without user direction, compare the identity token with the stored identity token to confirm an identity of the unconfigured computing device.

* * * * *

UNITED STATES PATENT AND TRADEMARK OFFICE
CERTIFICATE OF CORRECTION

PATENT NO. : 10,243,788 B1
APPLICATION NO. : 15/001678
DATED : March 26, 2019
INVENTOR(S) : Clifford Andrew White Page 1 of 1

It is certified that error appears in the above-identified patent and that said Letters Patent is hereby corrected as shown below:

In the Claims

• Column 16, Line 50: please delete ", the contact token"

Signed and Sealed this
Seventh Day of May, 2019

Andrei Iancu
*Director of the United States Patent and Trademark Office*